(12) United States Patent
Dey et al.

(10) Patent No.: US 10,902,453 B2
(45) Date of Patent: Jan. 26, 2021

(54) CROWD LEVEL DETECTION FOR IN-STORE SHOPPING

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 14/819,505

(22) Filed: Aug. 6, 2015

(65) Prior Publication Data

US 2017/0039587 A1    Feb. 9, 2017

(51) Int. Cl.
*G06Q 30/02*    (2012.01)

(52) U.S. Cl.
CPC ..... *G06Q 30/0235* (2013.01); *G06Q 30/0255* (2013.01); *G06Q 30/0261* (2013.01)

(58) Field of Classification Search
None
See application file for complete search history.

(56) References Cited

U.S. PATENT DOCUMENTS

| | | | |
|---|---|---|---|
| 5,295,064 A | 3/1994 | Malec et al. | |
| 6,123,259 A * | 9/2000 | Ogasawara | G06K 17/0022 235/380 |
| 7,734,513 B2 * | 6/2010 | Bonner | G01S 5/14 370/406 |
| 8,150,741 B2 | 4/2012 | Figueroa et al. | |
| 8,812,344 B1 * | 8/2014 | Saurabh | G06K 9/00778 705/7.29 |
| 9,769,368 B1 * | 9/2017 | Morford | H04N 5/23206 |
| 2002/0168084 A1 | 11/2002 | Trajkovic et al. | |
| 2006/0010027 A1 * | 1/2006 | Redman | G06Q 10/06311 705/7.16 |
| 2006/0200378 A1 * | 9/2006 | Sorensen | G06Q 10/063 705/7.29 |
| 2008/0306756 A1 * | 12/2008 | Sorensen | G06Q 30/02 705/27.1 |
| 2010/0291907 A1 * | 11/2010 | MacNaughtan | G06Q 30/0241 455/414.1 |

(Continued)

OTHER PUBLICATIONS

Ningyuan, Zengwei, Jianping, Yuanyi et al., "Advertisement and shopping guide system for large supermarkets based on wireless sensor network," 2012 IEEE International Conference on Computer Science and Automation Engineering (CSAE), Zhangjiajie, 2012, pp. 518-522, Downloaded on Sep. 25, 2020. (Year: 2012).*

(Continued)

*Primary Examiner* — Mathew R. Syrowik
(74) *Attorney, Agent, or Firm* — Edward J. Wixted, III (57) ABSTRACT

Embodiments of the present invention provide a method, computer program product, and computer system for predicting store busy times. The method includes gathering data associated with the active carts in the store. The method may also predict the number of active carts within the store based on historical data indicating the crowd level on a particular date. A discount offer is determined and offered to users for visiting the store at a specific time slot.

12 Claims, 4 Drawing Sheets

(56) References Cited

U.S. PATENT DOCUMENTS

| | | | |
|---|---|---|---|
| 2011/0125545 A1* | 5/2011 | Lehmann | G06Q 10/06314 705/7.24 |
| 2012/0239504 A1* | 9/2012 | Curlander | G06Q 30/02 705/14.66 |
| 2013/0103608 A1* | 4/2013 | Scipioni | G06Q 30/02 705/346 |
| 2013/0226655 A1* | 8/2013 | Shaw | G06F 17/5009 705/7.29 |
| 2013/0282520 A1* | 10/2013 | Tapley | G06Q 30/0641 705/26.8 |
| 2013/0297551 A1* | 11/2013 | Smith | G06N 5/02 706/48 |
| 2014/0108193 A1* | 4/2014 | Goulart | G06Q 30/0259 705/26.8 |
| 2014/0172476 A1* | 6/2014 | Goulart | G06Q 10/047 705/7.11 |
| 2014/0172489 A1* | 6/2014 | Goulart | G06Q 10/06312 705/7.22 |
| 2014/0184795 A1* | 7/2014 | Miller | G01C 21/3438 348/143 |
| 2014/0189096 A1 | 7/2014 | Miller et al. | |
| 2014/0195325 A1* | 7/2014 | Denevi | G06Q 20/24 705/14.34 |
| 2014/0222562 A1* | 8/2014 | Akgul | G06Q 30/0261 705/14.53 |
| 2014/0379296 A1* | 12/2014 | Nathan | G06Q 10/08 702/150 |
| 2015/0012380 A1 | 1/2015 | Bank et al. | |
| 2015/0051994 A1 | 2/2015 | Ward et al. | |
| 2015/0242770 A1* | 8/2015 | Song | G06Q 10/0631 705/7.12 |
| 2017/0032416 A1* | 2/2017 | Soni | G06Q 30/0254 |

OTHER PUBLICATIONS

Continuation of NPL above: Examiner downloaded on Sep. 25, 2020 from URL: https://ieeexplore.ieee.org/stamp/stamp.jsp?tp=&arnumber=6272826&isnumber=6272714 doi: 10.1109/CSAE.2012.6272826 for IEEE NPL (Year: 2012).*

Brandom, Russell, "Google Search can now tell you when a store gets crowded", The Verge, Jul. 28, 2015, pp. 1-2, <http://www.theverge.com/2015/7/28/9059923/google-search-crowds-lines-data>.

* cited by examiner

CROWD LEVEL DETECTION FOR IN-STORE SHOPPING

BACKGROUND OF THE INVENTION

The present invention relates generally to the field of shopping, and more particularly to detecting the crowd level in a store and notifying users of ideal shopping times.

An indoor positioning system (IPS), or indoor localization system, is a solution to locate objects or people inside a building using radio waves, magnetic fields, acoustic signals, or other sensory information collected by mobile devices. There is currently no de facto standard for an IPS design. Nevertheless, there are several commercial systems on the market. Instead of using satellites, IPS solutions rely on different technologies, including distance measurement to nearby anchor nodes (nodes with known positions, e.g., Wi-Fi access points), magnetic positioning, and dead reckoning. IPS s either actively locate mobile devices and tags or provide ambient location or environmental context for devices to get sensed. The localized nature of an IPS has resulted in design fragmentation, with systems making use of various optical, radio, or even acoustic technologies. The system may include information from other systems to cope for physical ambiguity and to enable error compensation.

SUMMARY

A method, computer program product, and computer system comprising: receiving, by one or more computer processors, a request for a crowd level at one or more time slots; gathering, by one or more computer processors, data associated with one or more active carts within a location, wherein a number of the one or more active carts are associated with a number of users within the location; predicting, by one or more computer processors, the number of the one or more active carts within the location at the one or more time slots, based in part on the data associated with the one or more active carts; determining, by one or more computer processors, a value of a discount offer for the user for visiting the location at the one or more time slots; and sending, by one or more computer processors, the one or more time slots and the value to the user.

DETAILED DESCRIPTION

Retail stores get very busy at times and are relatively empty at other times. Overcrowding in stores results in customers not finding, and subsequently not purchasing, every item they need. Also, stores lose out on business as customers typically look around more leisurely and purchase more items than needed (i.e., "impulse buy") when they find the store more comfortable to shop in. Sometimes, a high crowd level is due to inherent limitations that cannot be controlled (e.g., an approaching storm might result in a wave of shoppers at a store to purchase necessary items). At other times, however, load balancing can be used to reduce crowd level by distributing shoppers across time. Moreover, some sections within a store tend to attract a higher crowd level than others. Embodiments of the present invention provide systems and methods for increasing the efficiency of shopping using user data and a crowd level detection program, which manages active carts and communications with external hosts.

Figure 1:
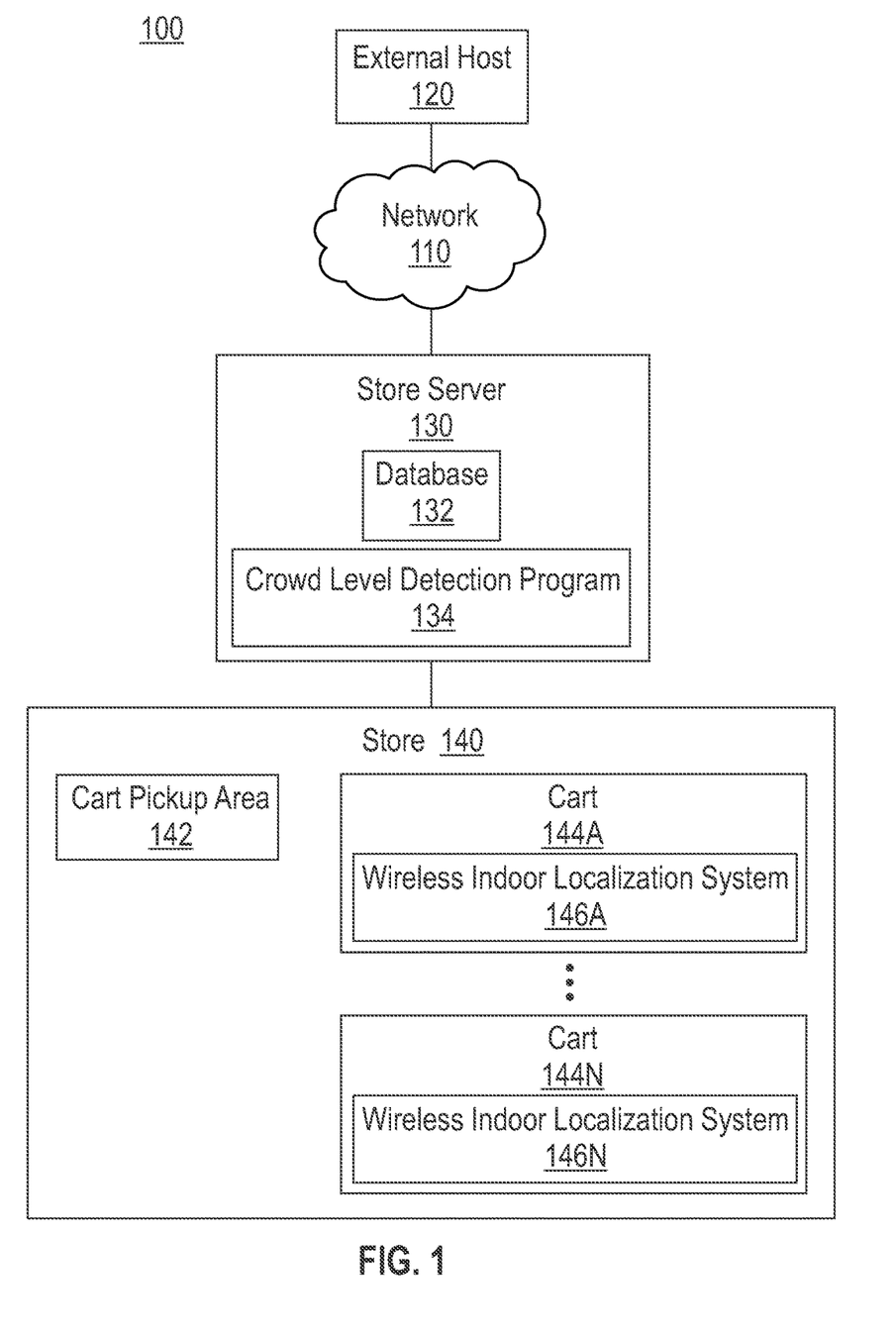
FIG. 1 is a functional block diagram illustrating an environment, in accordance with an embodiment of the present invention.

The present invention will now be described in detail with reference to the figures. FIG. 1 is a functional block diagram illustrating a crowd level detection processing environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, crowd level detection processing environment 100 includes store 140, store server 130, and external host 120 connected to store server 130 over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between external host 120 and store server 130.

External host 120 may be a computing device, such as a laptop computer, a tablet computer, a netbook computer, a personal computer (PC), a desktop computer, a personal digital assistant (PDA), a smart phone or wearable device, a thin client, or any programmable electronic device capable of communicating with store server 130 via network 110. In other embodiments, external host 120 may be a management server, a web server, or any other electronic device or computing system capable of receiving and sending data. External host 120 may include internal and external hardware components, as depicted and described in further detail with respect to FIG. 4.

Store 140 includes cart pickup area 142 and carts 144A through 144N (144A-N). Any number of carts 144A-N may be added to, or removed from, store 140 as required to support the management of store items. In this exemplary embodiment, store 140 is a shopping center and is capable of communicating data to and from external host 120, via store server 130. Cart pickup area 142 is a location within store 140 where users can obtain carts 144A-N.

Carts 144A-N comprise shopping carts, shopping baskets, or any other device that can be used to collect and store items while shopping. In this exemplary embodiment, carts 144A-N each include respective wireless indoor localization systems 146A through 146N (146A-N), which can be based on Wi-Fi, Bluetooth, iBeacon, RFID, or any known localization technology in the art. When carts 144A-N are idle, their batteries are automatically charged so that wireless indoor localization systems 146A-N work when they are in use within store 140. Wireless indoor localization systems 146A-N receive a data request from crowd level detection program 134 via store server 130, and send location data to crowd level detection program 134 via store server 130.

Store server 130 includes database 132 and crowd level detection program 134. Store server 130 may be a management server, a web server, or any other electronic device or computing system capable of receiving and sending data. Store server 130 may be physically located within store 140 or at a remote location. In other embodiments of the present invention, store server 130 can represent a computing system utilizing clustered computers and components to act as a single pool of seamless resources when accessed through a network. In this exemplary embodiment, store server 130 is capable of receiving requests for data from external host 120, via network 110. Store server 130 may include internal and external hardware components, as depicted and described in further detail with respect to FIG. 4.

Database 132 is a central storage for a set of store crowd level data. In this exemplary embodiment, database 132 contains the location information for carts 144A-N, individual user data, and historical data, including a calendar containing known busy times (e.g., holidays). For example, database 132 may contain, inter alia, the users' shopping lists, the estimated time taken by users currently in store 140, and users' general store visit pattern (i.e., the typical day and time the user shops).

Crowd level detection program 134 receives the location of carts 144A-N within store 140 via wireless indoor localization systems 146A-N. Crowd level detection program 134 is capable of detecting the number of users currently in store 140 from the number of active carts 144A-N in store 140. Crowd level detection program 134 is capable of detecting the number of carts in each section of store 140 by locating carts 144A-N within store 140 via wireless indoor localization systems 146A-N. Crowd level detection program 134 is also capable of predicting the crowd level at a future time or date using data in database 132. In this exemplary embodiment, crowd level detection program 134 processes requests from external host 120. Crowd level detection program 134 is capable of communicating with carts 144A-N, wireless indoor localization systems 146A-N, cart pickup area 142, and external host 120. In this exemplary embodiment, crowd level detection program 134 is capable of accessing database 132 to predict crowd levels at a future time or date. Crowd level detection program 134 can also be used to inform sales representatives to help in particular sections (i.e., more crowded sections), use crowd information for restocking sections, and use crowd information for suggesting better routes for individual users based on dynamic crowd information updates. In one embodiment, crowd level detection program 134 is an application which may be installed on external host 120. Crowd level detection program 134 can save user shopping lists and collect information about user store visit times to predict which times to recommend to a user, and map smartphone identification (i.e., external host 120) to a user's cart. Based on wireless indoor localization systems 146A-N, crowd level detection program 134 tracks user's interest in different sections of store 140 and uses this information for future suggestions to visit store 140 based on crowd information. Crowd level detection program 134 can determine store crowd level using individual user data and wireless indoor localization systems 146A-N, or using wireless indoor localization systems 146A-N only. If using the application installed on external host 120, crowd level detection program 134 can predict general user visit patterns using calendar entries to predict a user's trajectory movements for a particular day, can use analytics on emails, SMS, and personal data, and the size of the shopping cart chosen. The user can manually enter a preferred time slot using the application installed on external host 120. Crowd level detection program 134 can also predict the minimum expected time for any user to reach store 140 based on the GPS location of the user (i.e., application installed on external host 120), the user's mode of transportation, calendar entries, and any other user information useful in the prediction of user arrival.

Figure 2:
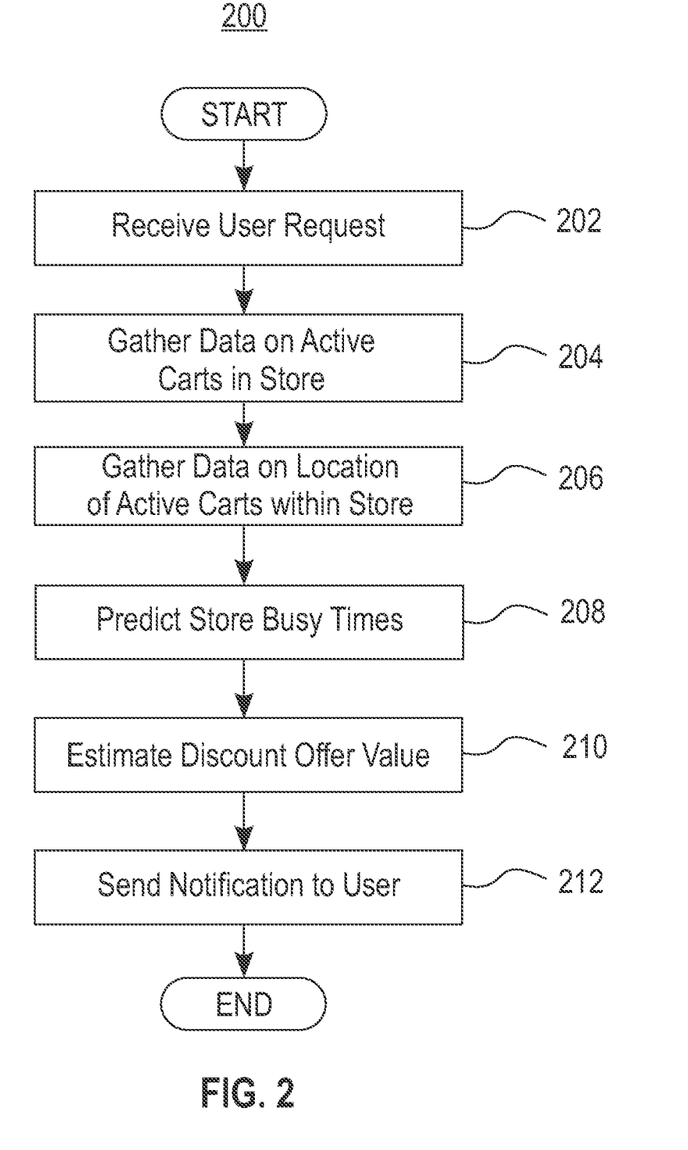
FIG. 2 is a flowchart depicting operational steps for fulfilling a crowd level detection request, in accordance with an embodiment of the present invention.

FIG. 2 is a flowchart, 200, depicting operational steps for fulfilling a crowd level detection request, in accordance with an embodiment of the present invention. For illustrative purposes, part of the following discussion is made with respect to cart 144A and wireless indoor localization system 146A; it being understood that the operational steps of FIG. 2 may be performed by any of carts 144A-N using any of wireless indoor localization systems 146A-N.

In step 202, crowd level detection program 134 receives a user request. In this exemplary embodiment, crowd level detection program 134 receives a request from external host 120, via network 110, for the current crowd level or the predicted crowd level at a future time or date, within store 140.

In step 204, crowd level detection program 134 gathers data on active carts 144A-N in store 140. An active cart is a cart that is being used by a user within store 140. An idle cart is a cart that is either not located within store 140 or a cart that is located in cart pickup area 142. In this exemplary embodiment, crowd level detection program 134 communicates with wireless indoor localization systems 146A-N to determine the location of carts 144A-N. For example, if cart 144A is located in cart pickup area 142 or the parking lot, then it is an idle cart. If cart 144A is located within store 140 and is not in cart pickup area 142, then it is an active cart. In some embodiments, when any of carts 144A-N are idle, wireless indoor localization systems 146A-N on those individual idle carts are inactive.

In step 206, crowd level detection program 134 gathers data on the location of active carts 144A-N within store 140. In this exemplary embodiment, crowd level detection program 134 communicates with wireless indoor localization systems 146A-N to determine the location of carts 144A-N within store 140. For example, if in step 204 crowd level detection program 134 determines that cart 144A is active, then crowd level detection program 134 will request the specific location of cart 144A within store 140 from wireless indoor localization system 146A. This location will determine which section of store 140 that cart 144A is located in (discussed in greater detail in FIG. 3).

In step 208, crowd level detection program 134 predicts store busy times. In this exemplary embodiment, crowd level detection program 134 uses the data gathered in steps 204 and 206, combined with data stored in database 132, to predict the crowd level at a future time or date. For example, a user is at home and is located twenty (20) minutes from store 140, but wants to go shopping now. Crowd level detection program 134 will use the current crowd level in store 140 (determined in step 204) and historical crowd level data in database 132 to predict the estimated crowd level in store 140 upon arrival (i.e., in 20 minutes). In another example, a user wants to go shopping next Tuesday after work at 5:30 PM. Crowd level detection program 134 will use historical crowd level data in database 132 to predict an estimated crowd level in store 140 at the indicated future time. In another embodiment, crowd level detection program 134 saves user shopping lists. Sectional crowd information helps crowd level detection program 134 determine which users to recommend visiting the store at what time based on the items in users' shopping lists. In one embodiment, crowd level detection program 134 determines whether the crowd level exceeds a predetermined threshold, wherein the predetermined threshold is based on the size of store 140. If the crowd level in store 140 exceeds this predetermined threshold, crowd level detection program will determine that store 140 is busy.

In step 210, crowd level detection program estimates the discount offer value. In this exemplary embodiment, crowd level detection program 134 sends discount offers to users for visiting store 140 at particular times in an effort to load balance the crowd. For example, if a user indicates a request to visit store 140 at a future time and crowd level detection program 134 determines store 140 will have a high crowd level at that time, then crowd level detection program 134 may offer the user certain discounts to come at another time when store 140 is predicted to be less busy. Similarly, the discount offer system can be utilized by users within store 140 on a sectional basis. For example, if a user is shopping in a busy section of store 140, then crowd level detection program 134 may offer the user certain discounts to proceed to another less busy section of store 140 to collect items on that user's shopping list. For both users not located in store 140 and users located in store 140, the value of the discount offer is directly proportional to the percentage of certainty of the crowd level during the suggested time. For example, if crowd level detection program 134 is 100% certain that store 140 or a section of store 140 will be empty, then crowd level detection program 134 will offer a high value discount. If crowd level detection program 134 is 50% certain that store 140 or a section of store 140 will be empty, then crowd level detection program 134 will offer a lower value discount. In addition, for users not located in store 140 the value of the discount offer is inversely proportional to the time difference between when a user is notified with the suggested time and the suggested time. For example, if crowd level detection program 134 gives the user a discount offer to arrive at store 140 in ten (10) minutes, the value of the discount offer will be high because the user has less time to plan. If crowd level detection program 134 gives the user a discount offer to arrive at store 140 in two (2) days, the discount offer will be lower because the user has a lot of time to plan. In some embodiments, the value of the coupon is related to the user profiles.

In step 212, crowd level detection program 134 sends a notification to the user. Crowd level detection program 134 fulfills the request received from the user in step 202 after predicting the estimated crowd level in store 140 at a given time. In this exemplary embodiment, crowd level detection program 134 sends this data to external host 120 via network 110.

Accordingly, by performing the operational steps of FIG. 2, the store crowd level can be detected and a user can plan to visit the store during non-busy times.

Figure 3:
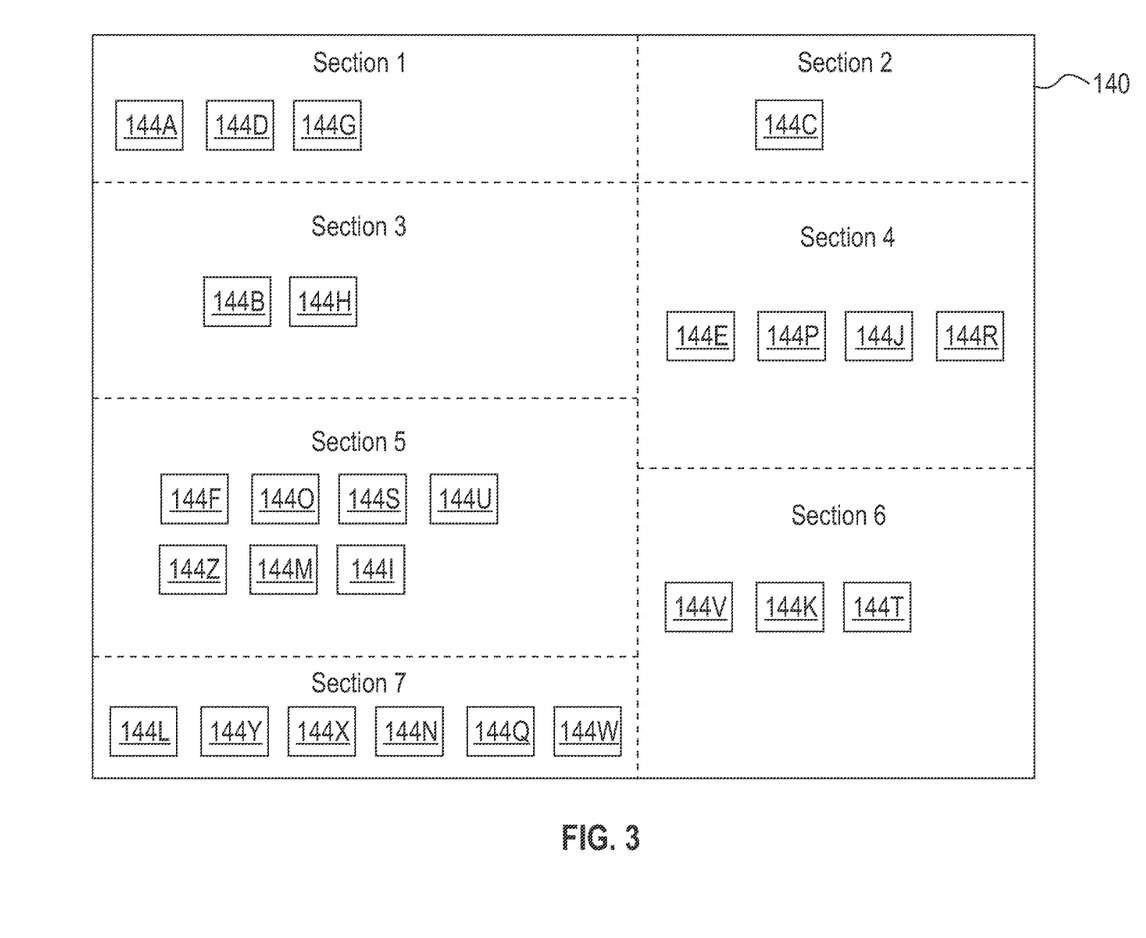
FIG. 3 is a diagram depicting an example plan view of a store in which active carts are located in various sections of the store, in accordance with an embodiment of the present invention.

FIG. 3 is a diagram depicting an example plan view of a store in which active carts are located in various sections of store 140, in accordance with an embodiment of the present invention.

In this exemplary embodiment, store 140 includes section 1, section 2, section 3, section 4, section 5, section 6, and section 7 (cart pickup area 142). Each of sections 1-6 represent a different section of store 140 (e.g., produce, frozen food, paper products, etc.). Store 140 also includes carts 144A-Z. Crowd level detection program 134 receives a request for the current crowd level in store 140 (step 202). Crowd level detection program 134 gathers data on active carts in store 140. In this example, carts 144L, 144Y, 144X, 144N, 144Q, and 144W are located in cart pickup area 142 (section 7) and are thus idle. The carts located in sections 1-6 are active. In this example, there are twenty (20) active carts within store 140 and six (6) idle carts in cart pickup area 142. Crowd level detection program 134 then determines the location of active carts within store 140 (step 206). Section 1 contains carts 144A, 144D, and 144G; section 2 contains cart 144C; section 3 contains carts 144B and 144H; section 4 contains 144E, 144D, 144J, and 144R; section 5 contains 144F, 144O, 144S, 144U, 144Z, 144M, and 144I; and section 6 contains carts 144V, 144K, and 144T. In this example, there are three (3) carts in section 1, one (1) cart in section 2, two (2) carts in section 3, four (4) carts in section 4, seven (7) carts in section 5, and three (3) carts in section 6, indicating that sections 4 and 5 are busy, while sections 1, 2, 3, and 6 are less crowded. Based on this data, crowd level detection program 134 can provide a user with a more efficient route throughout store 140. Crowd level detection program 134 may also provide discount offers to help load balance the crowd within each section of store 140. For example, crowd level detection program 134 may provide the user associated with cart 144I in section 5 a discount offer to proceed to section 2 and collect the items from that user's list located in section 2 (i.e., less crowded section of store 140).

A user may also create their own route throughout store 140 using this data to delay visiting busy sections until the crowd level in those sections has subsided.

Figure 4:
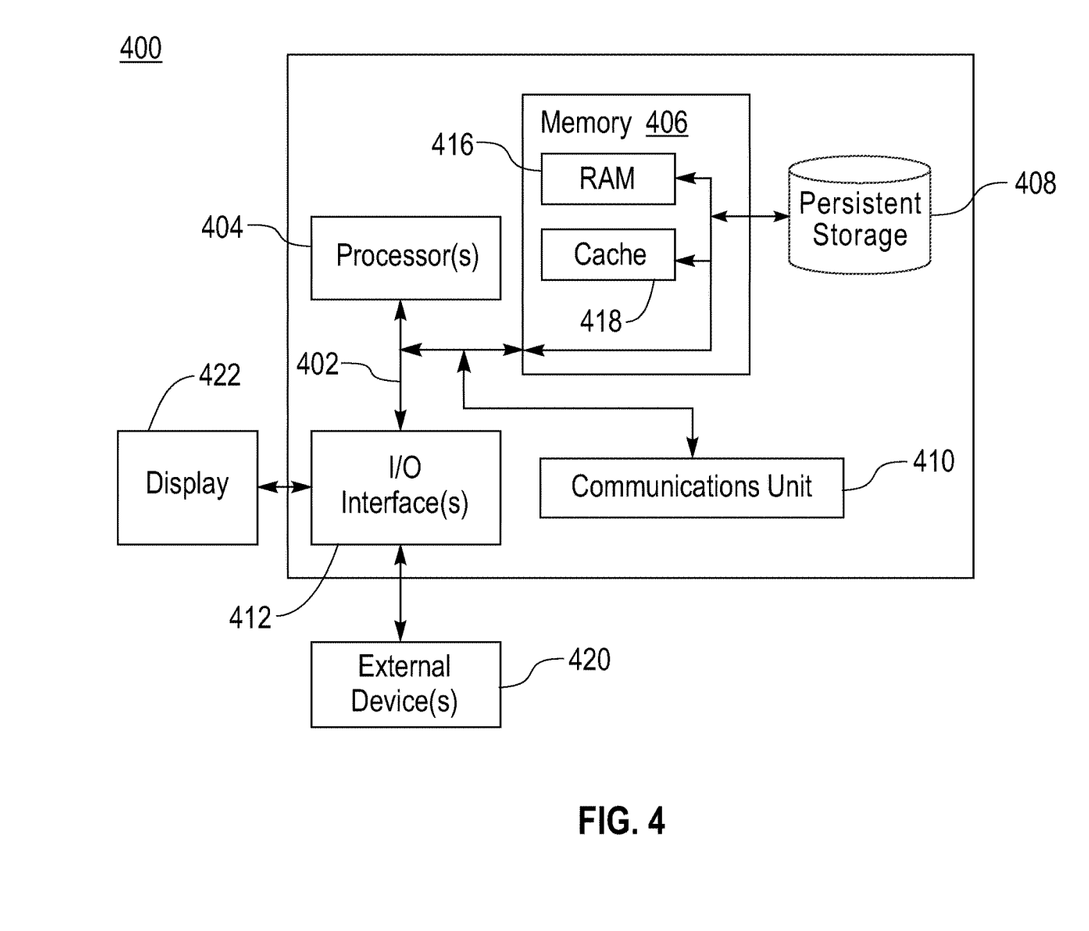
FIG. 4 is a block diagram of internal and external components of a computer system, in accordance with an embodiment of the present invention.

FIG. 4 is a block diagram of internal and external components of computing device 400, which is representative of the computing devices of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computerreadable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computerreadable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a request for a crowd level at a future time;
   gathering, by a wireless indoor localization system, data obtained from: (i) a first set of one or more sensors and (ii) a second set of one or more sensors, wherein:
   said wireless indoor localization system comprises:
      one or more shopping carts including one or more batteries and the one or more shopping carts being physically within a physical location;
      an area, within the physical location, wherein a battery, of a respective shopping cart that is idle and located in the area, is automatically charged;
      said first set of one or more sensors attached to said one or more shopping carts and providing tracking and localization information of said one or more shopping carts as part of said data obtained from the first set;
      said second set of one or more sensors associated with said physical location and providing tracking and localization information of said one or more shopping carts as part of said data obtained from the second set; and
      wherein said first set of one or more sensors and said second set of one or more sensors each include Wi-Fi, Bluetooth, and RFID, the first and second sets of sensors providing, as part of said data, a number of the one or more shopping carts that are actively being used within said physical location as an indication of a number of users within said physical location;
   wirelessly transmitting, from the wireless indoor localization system to the one or more computer processors, said data including said number of the one or more shopping carts that are actively being used;
   generating, by the one or more computer processors, an estimated time to be taken by said number of users within said physical location based on a calendar entry of a respective user within the physical location, a size of shopping cart associated with said respective user, and analytics of emails of said respective user;
   accessing, by the one or more computer processors, historical crowd level data corresponding to shopping carts previously sensed by the first and second sets of sensors of the wireless indoor localization system within the physical location and user shopping list data;
   calculating, by the one or more computer processors, a predicted crowd level within said physical location at a time slot for the future time, the calculating of the predicted crowd level being based on: said gathered data including said number of the one or more shopping carts that are actively being used from the wireless indoor localization system, said user shopping list data, said estimated time to be taken by the number of users within said physical location, and said historical crowd level data;
   determining, by the one or more computer processors, said time slot for the future time at which said physical location has a second number of active shopping carts, wherein said second number is below a predetermined threshold;
   determining, by the one or more computer processors, a value of a discount offer for said respective user for visiting said physical location at said time slot for the future time, wherein the determining said value of said discount offer is based on a probability that the crowd level of said physical location is below the predetermined threshold;
   sending, by the one or more computer processors, a notification of said time slot for the future time and of said discount offer to a smartphone of said respective user for visiting said physical location at said time slot; and
   generating, by the one or more computer processors, a suggested route for said respective user within said physical location based on (1) said number of the one or more shopping carts that are being actively used within said physical location, (2) the predicted crowd level, (3) a crowd level of each section of said physical location, and (4) data associated with said time slot, for the future time, at which said respective user visits said physical location.

2. The method of claim 1, wherein the gathering of said data obtained from the first and second sets comprises:
determining, by the wireless localization system, that a shopping cart is located within said physical location; and
determining, by the wireless localization system, that a shopping cart is not located within a shopping cart pickup area.

3. The method of claim 1, further comprising:
determining, by the localization system, a position of said one or more shopping carts within each section of said physical location.

4. The method of claim 1, further comprising:
gathering, by the indoor localization system, data associated with one or more time slots at which a number of users have visited said physical location;
determining, by the one or more computer processors, whether said crowd level of each section of said physical location exceeds said predetermined threshold, wherein said predetermined threshold is determined based on a size of said physical location; and
determining, by the one or more computer processors, crowd patterns based on the gathered data associated with the one or more time slots at which said number of users have visited said physical location.

5. The method of claim 1, wherein said historical crowd level data indicates a number of users which have visited said physical location.

6. A computer program product comprising:
a computer readable storage medium and program instructions stored on the computer readable storage medium, wherein the computer readable storage medium is neither a transitory signal per se nor transitory signals per se, the program instructions comprising:
program instructions to receive a request for a crowd level at a future time;
program instructions to gather, by a wireless indoor localization system, data obtained from (i) a first set of one or more sensors and (ii) a second set of one or more sensors, wherein:
said wireless indoor localization system comprises:
one or more shopping carts including one or more batteries and the one or more shopping carts being physically within a physical location;
an area, within the physical location, wherein a battery, of a respective shopping cart that is idle and located in the area, is automatically charged;
said first set of one or more sensors attached to said one or more shopping carts and providing tracking and localization information of said one or more shopping carts as part of said data obtained from the first set;
said second set of one or more sensors associated with said physical location and providing tracking and localization information of said one or more shopping carts as part of said data obtained from the second set; and
wherein said first set of one or more sensors and said second set of one or more sensors each include Wi-Fi, Bluetooth, and RFID, the first and second sets of sensors providing, as part of said data, a number of the one or more shopping carts that are actively being used within said physical location as an indication of a number of users within said physical location;
program instructions to wirelessly transmit, from the wireless indoor localization system to one or more computer processors, said data including said number of the one or more shopping carts that are actively being used;
program instructions to generate an estimated time to be taken by said number of users within said physical location based on a calendar entry of a respective user within the physical location, a size of shopping cart associated with said respective user, and analytics of emails of said respective user;
program instructions to access historical crowd level data corresponding to shopping carts previously sensed by the first and second sets of sensors of the wireless indoor localization system within the physical location and user shopping list data;
program instructions to calculate a predicted crowd level within said physical location at a time slot for the future time, the calculating of the predicted crowd level being based on: said gathered data including said number of the one or more shopping carts that are actively being used from the wireless indoor localization system, said user shopping list data, said estimated time to be taken by the number of users within said physical location, and said historical crowd level data;
program instructions to determine said time slot for the future time at which said physical location has a second number of active shopping carts, wherein said second number is below a predetermined threshold;
program instructions to determine a value of a discount offer for said respective user for visiting said physical location at said time slot for the future time, wherein said value of said discount offer is determined based on a probability that the crowd level of said physical location is below the predetermined threshold;
program instructions to send a notification of said time slot for the future time and of said discount offer to a smartphone of said respective user for visiting said physical location at said time slot; and
program instructions to generate a suggested route for said respective user within said physical location based on (1) said number of the one or more shopping carts that are being actively used within said physical location, (2) the predicted crowd level, (3) a crowd level of each section of said physical location, and (4) data associated with said time slot, for the future time, at which said respective user visits said physical location.

7. The computer program product of claim 6, wherein the program instructions to gather the data obtained from the first and second sets comprise:
program instructions to determine that a shopping cart is located within said physical location; and
program instructions to determine that a shopping cart is not located within a shopping cart pickup area.

8. The computer program product of claim 6, further comprising:
program instructions to gather data associated with one or more time slots at which a number of users have visited said physical location;
program instructions to determine whether said crowd level of each section of said physical location exceeds said predetermined threshold, wherein said predetermined threshold is based on a size of said physical location; and program instructions to determine crowd patterns based on the gathered data associated with the one or more time slots at which said number of users have visited said physical location.

9. The computer program product of claim 6, wherein said historical crowd level data indicates a number of users which have visited said physical location.

10. A computer system comprising:
a wireless indoor localization system comprising:
one or more shopping carts including one or more batteries and the one or more shopping carts being physically within a physical location;
an area, within the physical location, wherein a battery, of a respective shopping cart that is idle and located in the area, is automatically charged;
a first set of one or more sensors attached to said one or more shopping carts that provide tracking and localization information of said one or more shopping carts as data obtained from the first set;
a second set of one or more sensors associated with said physical location that provides tracking and localization information of said one or more shopping carts as data obtained from the second set; and
wherein said first set of one or more sensors and said second set of one or more sensors each include Wi-Fi, Bluetooth, and RFID, the first and second sets of sensors providing, as part of said data obtained from the first set and of said data obtained from the second set, a number of the one or more shopping carts that are actively being used within said physical location as an indication of a number of users within said physical location
one or more computer processors;
one or more computer readable storage media;
program instructions stored on the computer readable storage media for execution by at least one of the one or more computer processors, the program instructions comprising:
program instructions to receive a request for a crowd level at a future time;
program instructions to gather data from the wireless indoor localization system including the data obtained from the first set and the data obtained from the second set using (i) the first set of one or more sensors and (ii) the second set of one or more sensors;
program instructions to wirelessly transmit, from the wireless indoor localization system to the one or more computer processors, said data including said number of the one or more shopping carts that are actively being used;
program instructions to generate an estimated time to be taken by said number of users within said physical location based on a calendar entry of a respective user within the physical location, a size of shopping cart associated with said respective user, and analytics of emails of said respective user;
program instructions to access historical crowd level data corresponding to shopping carts previously sensed by the first and second sets of sensors of the wireless indoor localization system within the physical location and user shopping list data;
program instructions to calculate a predicted a crowd level within said physical location at a time slot for the future time, the calculating of the predicted crowd level being based on: said gathered data including said number of the one or more shopping carts that are actively being used from the wireless indoor localization system, said user shopping list data, said estimated time to be taken by the number of users within said physical location, and said historical crowd level data;
program instructions to determine said time slot for the future time at which said physical location has a second number of active shopping carts, wherein said second number is below a predetermined threshold;
program instructions to determine a value of a discount offer for said respective user for visiting said physical location at said time slot for the future time, wherein said value of said discount offer is determined based on a probability that the crowd level of said physical location is below the predetermined threshold;
program instructions to send a notification of said time slot for the future time and of said discount offer to a smartphone of said respective user for visiting said physical location at said time slot; and
program instructions to generate a suggested route for said respective user within said physical location based on (1) said number of the one or more shopping carts that are being actively used within said physical location, (2) the predicted crowd level, (3) a crowd level of each section of said physical location, and (4) data associated with said time slot, for the future time, at which said respective user visits said physical location.

11. The computer system of claim 10, wherein the program instructions to gather the data obtained from the first and second sets comprise:
program instructions to determine that a shopping cart is located within said physical location; and
program instructions to determine that a shopping cart is not located within the area, wherein the area is a shopping cart pickup area.

12. The method of claim 1, further comprising:
determining, by the one or more computer processors, a focal point of said user, using a third set of one or more sensors associated with said user and attached to a mobile device that provides distance information, directional information, time information, and geolocation, wherein said third set of one or more sensors includes a global positioning system (GPS) receiver; and
predicting, by the one or more computer processors, a minimum expected time for said user to reach said physical location, using a mode of transportation of said user, calendar entries of said user, said first set of one or more sensors, said second set of one or more sensors, and said third set of one or more sensors, wherein said first set of one or more sensors, said second set of one or more sensors, and said third set of one or more sensors are particularly installed and synced to allow information to be received from a plurality of places.

* * * * *